US011403356B2

(12) United States Patent
Kussmaul et al.

(10) Patent No.: US 11,403,356 B2
(45) Date of Patent: Aug. 2, 2022

(54) PERSONALIZING A SEARCH OF A SEARCH SERVICE

(71) Applicant: International Business Machines Corporation, Armonk, NY (US)

(72) Inventors: Timo Kussmaul, Boeblingen (DE); Uwe K. Hansmann, Tuebingen (DE); Kai Brennenstuhl, Boeblingen (DE); Andreas Prokoph, Boeblingen (DE); Thomas Steinheber, Maihingen (DE)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 16/384,981

(22) Filed: Apr. 16, 2019

(65) Prior Publication Data
US 2020/0334313 A1 Oct. 22, 2020

(51) Int. Cl.
*G06F 16/00* (2019.01)
*G06F 16/9536* (2019.01)
*G06F 16/901* (2019.01)
*G06F 16/903* (2019.01)
*G06F 16/9535* (2019.01)
(Continued)

(52) U.S. Cl.
CPC ...... *G06F 16/9536* (2019.01); *G06F 16/9024* (2019.01); *G06F 16/90335* (2019.01); *G06F 16/9535* (2019.01); *G06F 16/9566* (2019.01); *G06F 40/205* (2020.01)

(58) Field of Classification Search
None
See application file for complete search history.

(56) References Cited

U.S. PATENT DOCUMENTS

| 7,689,580 B2 | 3/2010 | Wang |
| 7,895,181 B2 | 2/2011 | Shaw |
| 8,135,615 B2 | 3/2012 | Bradley |

(Continued)

FOREIGN PATENT DOCUMENTS

| JP | 2004112318 A | 4/2004 |
| JP | 4042100 B2 | 2/2008 |
| WO | 0119017 A1 | 3/2001 |

OTHER PUBLICATIONS

"Amazon Cloudsearch", 7 pages, Jul. 3, 2018, copyright 2018, Amazon Web Services, <https://aws.amazon.com/cloudsearch/>.

(Continued)

*Primary Examiner* — Debbie M Le
(74) *Attorney, Agent, or Firm* — Alexander G. Jochym

(57) ABSTRACT

The invention relates to a method for personalizing a search of a search service. The search service comprises a search index with content items of a search type being used as first search results for first search queries issued by the client application and providing second search queries to be executed for retrieving second search results to be returned in reply to the first search queries. The method comprises using information specifying external content items imported by the client application to amend a set of content items for extracting one or more keywords comprised by the imported external content items. A second search query suitable for retrieving the set of content items being amended with the imported external content items is determined. The determined second search query is modified by adding the extracted keywords as additional search parameters.

20 Claims, 5 Drawing Sheets

(51) Int. Cl.
  *G06F 16/955* (2019.01)
  *G06F 40/205* (2020.01)

(56) References Cited

U.S. PATENT DOCUMENTS

| | | | |
|---|---|---|---|
| 8,244,749 | B1 | 8/2012 | Das |
| 8,316,019 | B1 | 11/2012 | Ainslie |
| 8,442,987 | B2 | 5/2013 | Leggetter |
| 8,793,573 | B2 | 7/2014 | Beckmann |
| 8,832,076 | B2 | 9/2014 | Gutlapalli |
| 9,098,497 | B1 | 8/2015 | Brette |
| 9,152,977 | B2 | 10/2015 | Zwicky |
| 9,165,079 | B1 * | 10/2015 | Kulick .................. G06F 16/335 |
| 9,213,749 | B1 | 12/2015 | Collins |
| 9,361,317 | B2 | 6/2016 | Lightner |
| 9,384,226 | B1 * | 7/2016 | Goel ..................... G06F 16/951 |
| 9,432,943 | B2 | 8/2016 | Alam |
| 9,519,715 | B2 * | 12/2016 | Dedhia ................. G06F 16/285 |
| 9,563,621 | B2 | 2/2017 | Halme |
| 9,697,016 | B2 | 7/2017 | Jacob |
| 9,697,258 | B2 | 7/2017 | Barton |
| 9,734,518 | B2 | 8/2017 | Suleman |
| 10,275,419 | B2 * | 4/2019 | Dedhia ................. G06F 16/285 |
| 10,440,030 | B2 | 10/2019 | Hind |
| 11,030,263 | B2 * | 6/2021 | Bortnikov ........... G06F 16/1734 |
| 11,263,286 | B2 * | 3/2022 | Brun ..................... G06F 16/907 |
| 2008/0208808 | A1 | 8/2008 | Sue |
| 2009/0125403 | A1 | 5/2009 | Li |
| 2010/0145896 | A1 | 6/2010 | Yuta |
| 2010/0223252 | A1 | 9/2010 | Broman |
| 2010/0250528 | A1 | 9/2010 | Punera |
| 2012/0078874 | A1 | 3/2012 | Gonzalez |
| 2012/0084291 | A1 | 4/2012 | Chung |
| 2012/0150831 | A1 | 6/2012 | Sun |
| 2013/0238783 | A1 | 9/2013 | Alexander |
| 2014/0358887 | A1 | 12/2014 | Morris |
| 2015/0026639 | A1 | 1/2015 | Nakamura |
| 2015/0161255 | A1 | 6/2015 | Battle |
| 2015/0309698 | A1 | 10/2015 | Senderek |
| 2016/0110460 | A1 | 4/2016 | Johnson |
| 2016/0259947 | A1 | 9/2016 | Negrea |
| 2017/0031916 | A1 | 2/2017 | Sayyadi-Harikandehei |
| 2017/0147580 | A1 | 5/2017 | Buchmann |
| 2017/0169111 | A1 * | 6/2017 | Baum ................... G06F 16/217 |
| 2017/0201523 | A1 | 7/2017 | Palmer |
| 2017/0220605 | A1 | 8/2017 | Nivala |
| 2017/0357725 | A1 | 12/2017 | Hornkvist |
| 2018/0121556 | A1 | 5/2018 | Badros |
| 2019/0130444 | A1 | 5/2019 | Fei |
| 2020/0104305 | A1 | 4/2020 | Wei |
| 2020/0167433 | A1 | 5/2020 | Karayev |

OTHER PUBLICATIONS

"Autoregressive model", From Wikipedia, the free encyclopedia, Last edited Mar. 28, 2019, <https://en.wikipedia.org/wiki/Autoregressive_model>.

"Bayes' theorem", From Wikipedia, the free encyclopedia, Last edited on Mar. 16, 2019, <https://en.wikipedia.org/wiki/Bayes'_theorem>.

"Bayesian inference", From Wikipedia, the free encyclopedia, Last edited on Mar. 29, 2019, <https://en.wikipedia.org/wiki/Bayesian_inference>.

"Bayesian probability", From Wikipedia, the free encyclopedia, Last edited on Feb. 23, 2019, <https://www/en.wikipedia.org/wiki/Bayesian_probability>.

"Bayesian statistics", From Wikipedia, the free encyclopedia. Last edited on Apr. 12, 2019, 4 pages, https://en.wikipedia.org/wiki/Bayesian_statistics#cite_note-bda-1>.

"Conditional probability", From Wikipedia, the free encyclopedia, Last edited on Mar. 18, 2019, <https://en.wikipedia.org/wiki/Conditional_probability>.

"Errors and residuals", From Wikipedia, the free encyclopedia, last edited Dec. 28, 2018, <www.https://en.wikipedia.org/wiki/Erros_and_residuals>.

"Event (probability theory)", From Wikipedia, the free encyclopedia, Last edited on Mar. 25, 2019, <https://en.wikipedia.org/wiki/Event_(probability_theory)>.

"Frequentist probability", From Wikipedia, the free encyclopedia, Last edited on Mar. 14, 2019, <https://en.wikipedia.org/wiki/Frequentist_probability>.

"George E.P. Box", From Wikipedia, the free encyclopedia, Last edited on Mar. 29, 2019, <www.https://en.wikipedia.org/wiki/George_E._P._Box>.

"Gwilym Jenkins", From Wikipedia, the free encyclopedia, Last edited on Jan. 12, 2017, <www.https://en.wikipedia.org/wiki/Gwilym_Jenkins>.

"Headless Crawling", 2 pages, printed Jul. 3, 2018, copyright 2017 Ryte, <https://en.ryte.com/wiki/Headless_Crawling>.

"JaSpell::Java Spelling Checking Package", SourceForge, 2004 copyright Bruno Marins—XLDB Group, Apr. 12, 2019, 1 page, <http://jaspell.sourceforge.net/>.

"Limit of a sequence", From Wikipedia, the free encyclopedia, Last edited on Feb. 6, 2019, <https://en.wikipedia.org/wiki/Limit_of_a_sequence>.

"Linear combination", From Wikipedia, the free encyclopedia, Last edited Oct. 22, 2018, <https://en.wikipedia.org/wiki/Linear_combination>.

"Moving-average model", From Wikipedia, the free encyclopedia, Last edited on Dec. 8, 2018, <https://en.wikipedia.org/wiki/Moving-average-model>.

"Open-Source Content Management Systems Lack Security", 5 pages, Aug. 25, 2018, <https://expert.services/blog/managing-your-website/security/hacking-open-source-cms.html>.

"Peter Whittle (mathematician)", From Wikipedia, the free encyclopedia, Last Edited on Feb. 27, 2019, <https://en.wikipedia.org/wiki/Peter_Whittle_(mathematician)>.

"Probability distribution", From Wikipedia, the free encyclopedia, Last edited on Mar. 29, 2019, <https://en.wikipedia.org/wiki/Probability_distribution>.

"Probability interpretations", From Wikipedia, the free encyclopedia, Last edited on Feb. 28, 2019, <https://en.wikipedia.org/wiki/Probability_interpretations>.

"Probability", From Wikipedia, the free encyclopedia, Last Edited on Mar. 18, 2019, <https://en.wikipedia.org/wiki/Probability>.

"Stationary process", From Wikipedia, the free encyclopedia, Last edited on Mar. 15, 2019, <https://en.wikipedia.org/wiki/Stationary_process>.

"Statistical model", From Wikipedia, the free encyclopedia, Last edited on Apr. 1, 2019, <https://en.wikipedia.org/wiki/Statistical_model>.

"Statistics", From Wikipedia, the free encyclopedia, Last edited on Mar. 29, 2019, <https://en.wikipedia.org/wiki/Statistics>.

"The making of ERS 2.0—Getting Started with Cloud CMS", 17 pages, 2017, The Headless Meet Cloud CMS, <https://www.google.com/url?sa=t&rct=j&q=&esrc=s&source=web&cd=1&ved=0ahUKEwj-pISd85bcAhWDfisKHYqbBa4QFggnMAAA&url=https%3A%2F%2Fwww.cloudcms.com%2Fdownloads%2Fpdfs%2FThe_Making_of_ERS.pdf&usg=AOvVaw1A17jUjRveK-5zAixyNjus>.

"Time series", From Wikipedia, the free encyclopedia, Last edited on Mar. 13, 2019, <https://en.wikipedia.org/wiki/Time_series>.

Adhikari, et al., "An Introductory Study on Time Series Modeling and Forecasting", 67 pages, <https://arxiv.org/ftp/arxiv/papers/1302/1302.6613.pdf>.

Cleveland, et al., "STL: A Seasonal-Trend Decomposition Procedure Based on Loess", Journal of Official Statistics, vol. 6, No. 1, 1990, pp. 3-73, <https://www.wessa.net/download.stl.pdf>.

Exalead, "Search-Based Applications (SBAs)", Exalead Solutions Brief: Search-Based Applications (SBAs), v 1.1 © 2010 Exalead, pp. 1-8.

Kauffman, "A Better Authoring Experience for Headless CMS's", Mar. 7, 2018, pp. 1-4, <https://www.bloomreach.com/en/blog/2018/03/a-better-authoring-experience-for-headless-cms%E2%80%99s.html>.

(56) References Cited

OTHER PUBLICATIONS

Mell et al., "The NIST Definition of Cloud Computing", Recommendations of the National Institute of Standards and Technology, Special Publication 800-145, Sep. 2011, 7 pages.

Rack Blogger, "Content Management System Comparison: Performance Optimization", Jan. 20, 2011, The Official Rackspace Blog, 3 pages, <https://blog.rackspace.com/content_management_system_comparison_performance_optimization>.

Whittle, Peter, "Hypothesis testing in time series analysis", Uppsala, Almqvist & Wiksells boktr. 1951, 120 pages, <https://www.worldcat.org/title/hypothesis-testing-in-time-series-analysis/oclc/22153644>.

Kussmaul, "Improved Navigation Paths Between Content Items", U.S. Appl. No. 16/384,977, filed Apr. 16, 2019.

Kussmaul, et al., "Automatic Adaption of a Search Configuration", U.S. Appl. No. 16/384,973, filed Apr. 16, 2019.

Kussmaul, et al., "Automatic Check of Search Configuration Changes", U.S. Appl. No. 16/384,974, filed Apr. 16, 2019.

Kussmaul, et al., "Managing Search Queries of a Search Service", U.S. Appl. No. 16/384,979, filed Apr. 16, 2019.

Kussmaul, et al., "Preventing Search Fraud", U.S. Appl. No. 16/384,978, filed Apr. 16, 2019.

Kussmaul, et al., "User-Driven Adaptation of Rankings of Navigation Elements", U.S. Appl. No. 16/384,975, filed Apr. 16, 2019.

List of IBM Patents or Patent Applications Treated as Related, Appendix P, Filed Herewith.

\* cited by examiner

PERSONALIZING A SEARCH OF A SEARCH SERVICE

BACKGROUND

The present disclosure relates to the field of electronic data processing and, more specifically, to personalizing a search of a search service.

Client applications, also referred to as search-based applications, may rely on a search service to identify and retrieve information that is required for the functionality of the client application, like content and navigation elements. The client application sends during runtime search queries to the search service and retrieves the information that is required, e.g., for rendering application views from search results of the search queries. The application views present the content and the navigation elements retrieved from the search service to a user of the client application.

SUMMARY

Various embodiments provide a method for personalizing a search of a search service as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for personalizing a search of a search service. The search service comprises a search engine, a search index and an interface configured for communicating with a client application. The search index comprises content items of a search query type for use as first search results for first search queries issued by the client application. The content items of the search query type comprise second search queries for use by the search service to search for second search results to be returned to the client application as search results for the first search queries. The client application comprises a personalization component with an interface configured for importing one or more external content items from one or more sources of external content and for amending with the imported external content items a set of content items retrieved from the search service using a first search query. An analysis component is provided for analyzing the imported external content items.

The method comprises receiving information specifying the imported external content items by the analysis component. The received information is used by the analysis component for extracting one or more keywords comprised by the imported external content items. A content item of the search query type comprising a second search query suitable for retrieving the set of content items being amended with the imported external content items is determined. The determined second search query is modified by adding the extracted keywords as additional search parameters of the determined second search query. The modified second search query is stored as a content item of the search query type in the search index of the search service.

In a further aspect, the invention relates to a computer program product comprising a non-volatile computer-readable storage medium having computer-readable program code embodied therewith for personalizing a search of a search service. The search service comprises a search engine, a search index and an interface configured for communicating with a client application. The search index comprises content items of a search query type for use as first search results for first search queries issued by the client application. The content items of the search query type comprise second search queries for use by the search service to search for second search results to be returned to the client application as search results for the first search queries. The client application comprises a personalization component with an interface configured for importing one or more external content items from one or more sources of external content and for amending with the imported external content items a set of content items retrieved from the search service using a first search query. An analysis component is provided for analyzing the imported external content items.

The personalizing of the search of the search service comprises receiving information specifying the imported external content items by the analysis component. The received information is used by the analysis component for extracting one or more keywords comprised by the imported external content items. A content item of the search query type comprising a second search query suitable for retrieving the set of content items being amended with the imported external content items is determined. The determined second search query is modified by adding the extracted keywords as additional search parameters of the determined second search query. The modified second search query is stored as a content item of the search query type in the search index of the search service.

In a further aspect, the invention relates to a computer system for personalizing a search of a search service. The search service comprises a search engine, a search index with content items and an interface configured for communicating with a client application. The search service comprises a search engine, a search index and an interface configured for communicating with a client application. The search index comprises content items of a search query type for use as first search results for first search queries issued by the client application. The content items of the search query type comprise second search queries for use by the search service to search for second search results to be returned to the client application as search results for the first search queries. The client application comprises a personalization component with an interface configured for importing one or more external content items from one or more sources of external content and for amending with the imported external content items a set of content items retrieved from the search service using a first search query. An analysis component is provided for analyzing the imported external content items.

The computer system comprises a processor and a memory storing machine-executable program instructions. Executing the program instructions by the processor causes the processor to control the computer system to receive information specifying the imported external content items by the analysis component. The received information is used by the analysis component for extracting one or more keywords comprised by the imported external content items. A content item of the search query type comprising a second search query suitable for retrieving the set of content items being amended with the imported external content items is determined. The determined second search query is modified by adding the extracted keywords as additional search parameters of the determined second search query. The modified second search query is stored as a content item of the search query type in the search index of the search service.

BRIEF DESCRIPTION OF THE SEVERAL VIEWS OF THE DRAWINGS

In the following, embodiments of the invention are explained in greater detail, byway of example only, making reference to the drawings in which.

DETAILED DESCRIPTION

Figure 1:
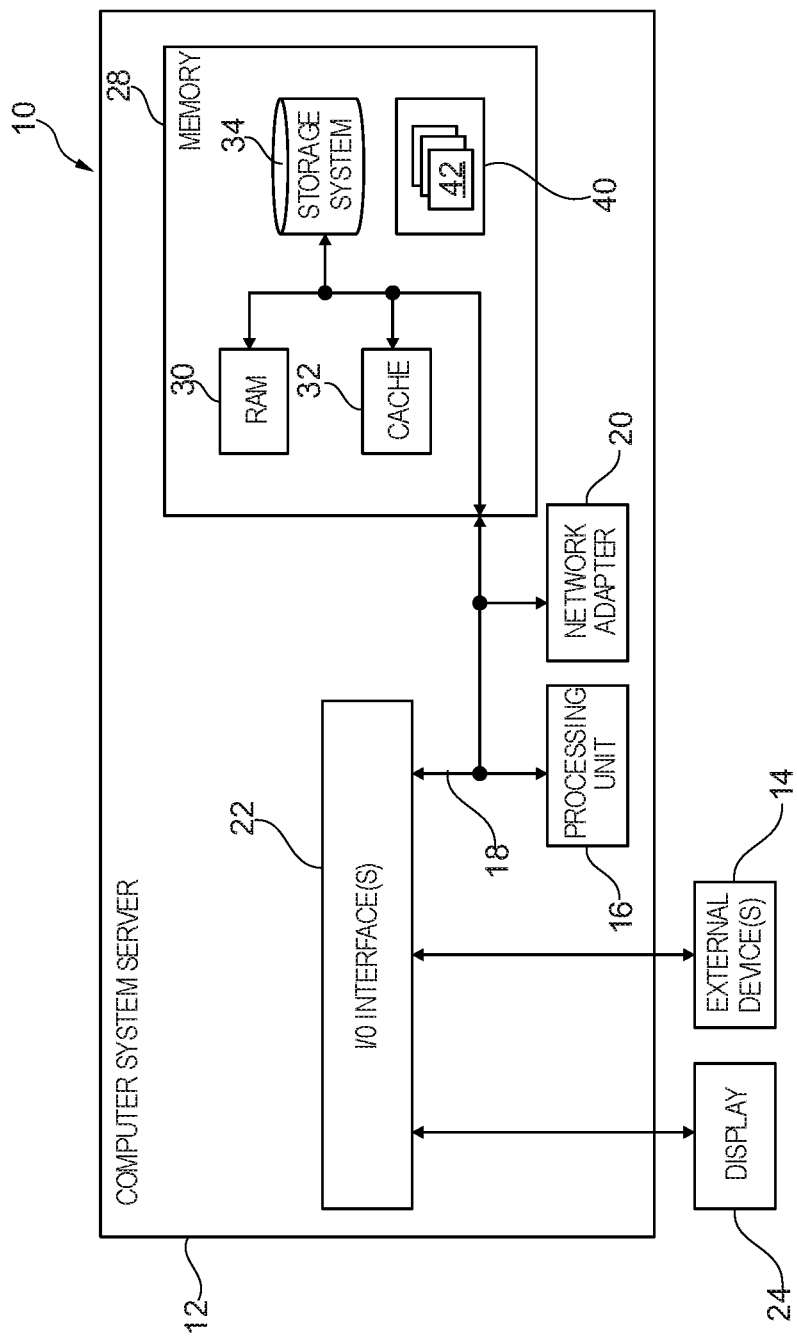
FIG. 1 depicts a schematic diagram illustrating an exemplary cloud computing node according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing a method for personalizing searches of search services using sources of external content. The personalized searches may be used by a client application, i.e., a search-based application, to retrieve content items provided to a user in form of an application view on a user interface. The personalization takes into account external content items imported by the client application from sources of external content. These sources of external content may be provided in form of webpages accessible by the client application via a network, e.g., the Internet. A user may for example add external content items to a set of content items provided to the user by an application view of the client application using a drag and drop operation to transfer the external content items, e.g., from a web browser, to the application view. A user of a search-based application may be enabled to adapt and extend the content that is presented by the client application according to user individual preferences. For this purpose, the user may drag and drop the external content items from other applications, websites, an authoring user interface or other content management system views into the application. The user either drags and drops the external content items themselves or a link which identifies the respective external content items to be added. The external content items to be added are analyzed to gain enriched metadata in form of one or more keywords.

Information specifying the amendment of the application view is provided to an analysis component, e.g., of a content management system, for analysis and used for modifying second search queries to take into account the respective amendment for futures searches. The modified second search queries may be used for future searches such that the next time the client application issues a first search query for retrieving content items to be provided by the application view to the user, the search takes into account the amendment. In other words, a personalized search is performed taking into account user individual preferences expressed by the amendment of the application view. The application view rendered using a search result received in reply to the first search query after the modification of the second search query will comprise the external content items and/or additional external content items related to the external content items imported before.

By automatically modifying a second search used to retrieve the content items represented by application views to also include external content items according to the metadata extracted by the analysis component, the client application may in the future include external content items in the application view identical or similar to the external content dragged and dropped by the user.

The basic search-based application pattern based on second search queries provided as content items of a search query type may comprise a two-phase search process. By issuing one or more first search queries to the search service, the search-based application may retrieve content items, comprising content data, menu items, navigation elements, like links to other pages or views, to be presented to the user in an application view. The menu items and navigation elements are represented as content items in the search index, and may be managed i.e. created, read, updated and/or deleted (CRUD), through an authoring service. The search service executes the first search queries and returns the resulting content items to the search-based application. The resulting content items may be ordered according to a ranking computed by the search service or a sub-component of the search service.

According to the two-phase search process, the search results returned to the search-based application are not the first results retrieved by the search service executing the first search queries. The process rather uses second search queries provided as content items of the search query type. These second search queries are not managed by the client application. For example, the second search queries provided by the content items of the search query type are managed by a content management system. Thus, a personalized search of the search service may be implemented by personalizing the second search queries without a requirement to modify the client application.

In order to be able to provide personalized second search queries, the first search queries issued by the client application may comprise, e.g., an application identifier identifying the client application as well as an application view identifier of a certain application view of the client application as additional search parameters. Alternatively, a second search query identifier identifying a second search query may be added as an additional search parameter. Thus, the first search queries may search for specific second search queries or second search queries assigned to the respective application and/or application view. Theses second search queries may be personalized. Personalization may comprise modifying the search parameters of the respective second search query according to user individual preferences and/or assigning the second search query to the user or a user group comprising the user by adding a user identifier identifying the user or a user group identifier identifying the user group, respectively. The first search query may as part of a boost sub-query comprise the user identifier and/or the group identifier, thus ensuring that a potential personalized version of the second search query comprising the user identifier or user group identifier is ranked higher than a non-personalized version without the respective identifiers. The first query and its execution implement the first phase.

The second phase is implemented by the second search query and its execution enabling a personalized search. The search index of the search service comprises a set of content items representing second search queries. These content items are referred to as content items of the search type and may comprise a representation of a search query in a suitable syntax, e.g., in Solr query syntax, as well as a set of keywords used for finding and/or ranking the content item. These keywords may comprise a client application identifier identifying a client application and/or a second search query identifier identifying a second search query as well as optionally a user identifier identifying a user and/or a user group identifier identifying a user group. In case the second search query is personalized for multiple users or groups of users, there may be multiple personalized versions of one second search query for different users or user groups. The second search query may be created or modified either automatically, e.g., by a tool or an automatic adaptation method, or by a content author directly editing the corresponding content item of the search query type in the authoring service. The search service may find, rank and return a set of one or more second search queries in response to executing a first search query received from the client application.

A content management system managing the content items including the content items of the search query type may either automatically execute a top-ranked second search query and return the resulting second search result in reply to the first search query to the client application or may return a set of one or more ranked second search queries to the client application, which may execute the top-ranked second search query using the search service. The client application uses the second search results of the second search query received in reply to the first search query to render an application view. The client application may rely on the ranking of the second search results for selecting or sequencing content items, like menu items, navigation elements, etc. in the application view.

Modifying the second search query to take into account external content items according to user individual preferences may directly influences the user experience of the application without requiring a code change in the client application. An application view rendered using the second search result of the modified second search query may comprise the external content items used by the user before or similar external content items, without requiring the user to repeat the amendment. Thus, the user experience of a search-based application may be enhanced. An intuitive and easy to use method for extending and personalizing a search-based application may be provided. Furthermore, user confidence and user productivity may be improved as well as maintenance and support costs be lowered. This method may be implemented to work automatically without requiring modifications and/or code changes in the client application.

In a service-oriented software architecture, a service refers to a software component which provides an application programming interface (API) configured to be accessible or invokable by other services or software components using a standard protocol or a standard invocation mechanism. A service may be implemented, created, removed, deployed, started and stopped independently of other services.

An API refers to a set of predefined methods of communication among software components. An API may comprise a set of subroutine definitions, communication protocols, and/or tools for building software. Thus, an API may provide a set of building blocks which may be combined for developing computer programs. An API specification defining an API may, e.g., comprise specifications for routines, data structures, object classes, variables, an/or remote calls.

In a service infrastructure, multiple instances of one service may be running in order to improve fault tolerance, throughput and load balancing of service requests. Each of the instances of the service may provide the same APIs and the same functionality. Each of the instances may be based on the same implementation, e.g., code, docker image and/or deployment artefact.

An interaction of a first service with a second service may comprise sending a service request for invoking an operation of one of the APIs provided by the second service. A service request may comprise an identifier of the requested API operation, e.g., in form of an URL or another parameter. In addition, a service request may comprise further data relevant for processing the service request.

A service infrastructure may comprise at least one service registry providing functionality for a service discovery and/or service lookup. A service registry may manage information about active, i.e., running, services of the service infrastructure. Before a first service invokes a second service, the first service may send a lookup request to the service registry containing a set of one or more criteria for selecting the second service, such as a service name and/or service identifier. A service name may be hardcoded in an implementation of the first service. Upon receipt of the lookup request, the service registry may select a service instance which adheres to the specified one or more criteria specified by the lookup request and return information about the selected service instance to the first service. The respective information may comprise an address, e.g., an URL, hostname, IP address and/or port, for use by the first service to create and send an invocation request to the second service. In case there is no service satisfying the one or more criteria specified by the lookup request, the service registry may return an error message.

A service registry may maintain information about a status and/or health of each service instance and consider only healthy services for service discovery requests, i.e., service lookup requests. In case a service instance becomes unresponsive and/or unhealthy, the service registry may no longer provide an address and/or information about the respective service instance to other services. The service registry may further incorporate a load balancing algorithm for distributing load between service instances, e.g., using random choice, round robin, and/or least connections.

A service may register at the service registry, e.g., immediately after starting. The registering may for example comprise sending a registration request including an address of the service to be registered. The registration request may further comprise data like, e.g., a service identifier and/or a set of identifiers of one or more APIs provided by the service to be registered. The service registry may, e.g., regularly, invoke a health check, e.g., in form of a status request, on each registered service. The invoked service may respond by returning status information. The status information may, e.g., comprise a flag indicating whether the respective service is healthy or unhealthy. If the returned status indicates a problem or if a service does not respond in time, the service registry may flag the respective service as unhealthy.

According to embodiments, a service registry may select a service instance based on two simple criteria: a binary flag representing a health status of the respective service and a service identifier, like, e.g., a service name.

A services infrastructure may be built using cloud computing. A computing component of the cloud may be separated from the Internet, e.g., by a firewall. An API gateway may provide access to client applications, i.e., client application programs, like mobile applications executed on a mobile communication device, e.g., a smartphone, to desktop applications executed on desktop computers, scripts executed in a browser, etc. An API gateway may receive requests issued by client applications and create a service lookup requests using the client requests. The service lookup requests may be sent to the service registry by the API gateway. In response to sending the service lookup requests, the API gateway may receive one or more addresses of service instances to be invoked and send invocation requests to the respective service instances. In response to sending the invocation requests, the API gateway may receive responses from the respective service instances and create one or more responses to the client request using the responses received from the service instances. The responses created by the API gateway may be returned to the requesting client applications.

While processing a request received from an API Gateway, a service instance may need to invoke another service. For this purpose, the service instance may prepare a lookup request, send the prepared lookup request to a service registry, receive in response to sending the lookup request an address of a service instance and invoke the respective service instance using the received address.

Services may use state of the art software engineering mechanisms, like, e.g., caching, persistent storage, session and state management, connection and thread pooling, etc. For example, caching may improve performance. A computer system may cache, i.e., store in a cache memory, data that was recently used, e.g., while processing recent requests. Since requests may be distributed between service instances, individual service instances may have different cache entries. In other words, the state of a service instance may depend on an individual usage history of the respective service instance. Service performance may depend on whether data relevant for processing a request is available in a cache memory assigned to the respective service or not. Thus, service performance for processing the same request may differ between individual service instances. It is therefore preferable to intelligently select service instances for processing a request.

A service performance may depend on the data in a cache memory assigned to the respective service. However, there may be no standard for sharing detailed information about cache contents between service instances and service registries. Thus, this information may not be available during service lookup, e.g., for selecting a particular service instance.

A service infrastructure and a service implemented therein, like, e.g., a search service, may serve multiple users and multiple tenants. A tenant refers to a group of users, e.g., a company, who share a common access with specific privileges to a software instance, i.e., a service instance. The service infrastructure and implemented service may ensure that tenant specific data assigned to a particular tenant is isolated from other tenants. Client requests and service requests may comprise a tenant identification identifying a tenant which is associated with the respective requests. The tenant identification may enable the service infrastructure component to establish a context and state required for processing the respective requests.

A content management system (CMS) may manage a creation of digital content items, such as text documents, webpages, images, videos, code scripts, etc. A content management system may support multiple users in a collaborative environment. Modern enterprise-scale content management systems may be based on separate content authoring and content delivery systems. Thereby, different requirements of content creation and retrieval tasks may be met. A process responsible for creating, modifying and editing content may take place in the authoring system and be referred to as authoring. A process responsible for transferring content from the authoring system to the delivery system may be referred to as publishing. A content is either transferred as it is, e.g., text, video, images, static files, or in a transformed formed, e.g., in pre-render templates.

A content management system may provide an authoring user interface for editing and managing content items. A content management system may be configured as a headless CMS, i.e., may not provide a visual user interface, but rather provide a set of APIs, which may be called by client applications to create, edit and retrieve content items.

This may allow a client application to provide a user interface and functionality for content authoring as well as to invoke APIs to create, edit and retrieve content items.

An authoring system may allow content authors to create, edit and manage content items. The authoring system may include an authoring user interface or may just provide authoring APIs. Furthermore, the authoring system may allow to upload or import files.

A content management system may further provide a publishing system configured for publishing content items from the authoring system to a delivery system or component, like a content delivery network (CDN), to make the content available to the public. The publishing system may also incorporate further functionalities, like indexing content items in a search index, modifying, transforming or pre-rendering content items, etc. Publishing may be started manually by a content author, may be invoked on schedule or may be invoked via a publishing API operation.

A content management system may provide a functionality to define different types of content items. For example, the content management system may provide a predefined list of possible content item types. The type of a content item may, e.g., be selected by the user using an authoring system or component. The content management system may represent and store the content item type as a specific field in the content item. The respective field may, e.g., be named "type" or "classification". For example, a content management system may provide the following predefined content item types: "content", "asset", "page", "page template". A content management system and client applications, which retrieve and use the content items, may handle content items of different type separately. For example, a client application may use a first content item of type "page" to render a view of a page.

A content management system may be deployed in a cloud environment and implemented as a set of interacting services. An API gateway may provide an API to application programs, like, e.g., client application, authoring application, etc. and forward requests and responses between the respective applications and the services provided by the content management system.

A content management system may comprise a search service component or may alternatively use a search service external to the content management system. An authoring system may allow content authors to search for content items, a publishing system may index published content items in a delivery search index, thereby allowing client applications to search for content items. The authoring system may index content items in an authoring index, when a content item is created, updated or deleted. The publishing system may index content items during publishing. As part of publishing, the publishing system may further update a configuration of the search index and invoke a learning to rank method in a training mode in order to recalculate a ranking model.

End users may rely on a search service to find a certain content in the website, like, e.g., products in a web shop. Furthermore, content management system client applications may use the search to lookup content to be rendered and content for establishing, e.g., a page hierarchy for navigation. Therefore, search quality and relevance ranking of search results may be important for end users as well as for an operator of a website.

A search service may provide functionality for searching in unstructured data, like, e.g., text documents. For this purpose, a search service provides functionality to create a search index by indexing content items, i.e., data to be searched, like, e.g., text documents. A search index may contain a representation of a data content to be searched, in a representation which is suited, e.g., improved, for processing by the search service. The search service may provide an application programming interface API for indexing content items, which makes the respective content items searchable by the search service. Furthermore, the search service may provide a query API allowing a client, e.g., another service or an application, to issue a search query. A search query may contain a set of query parameters specifying search criteria for searching content items, like, e.g., a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like, e.g., a ranking query, a boost query and/or a boost function. Furthermore or alternatively, a search service may automatically select one or more heuristics and/or parameters for a search ranking. A search ranking may for example be based on statistics about the search index and the search terms used for a search. Furthermore, the search ranking may be based on statistics of an occurrence of search terms in specific content items.

For a ranking, e.g., the tf-idf method (term frequency-inverse document frequency) may be used, which is a numerical statistic intended to reflect an importance or relevance of a word for a document in a search index. Tf-idf values may be used in a search service as weighting factors in ranking a document's relevancy relative to a given search query. An tf-idf value increases proportionally to the number of times a word appears in a document and is offset by the frequency of appearance of the word in the search index.

A search service may manage multiple search indexes, e.g., assigned to multiple tenants. Thus, a search service may be used in a multi-tenant environment, e.g., by creating a separate search index for each tenant. In this case, search client services may be required to select the correct search index to use for search requests depending on a tenant context.

A search index may be associated with a specific search configuration, consisting of multiple configuration parameters defining settings which control search functionality, behavior and, e.g., the structure of the content items in a search index. Search configuration parameters may be updatable and/or changeable via a search service API or by uploading a set of configuration parameter changes, e.g., in form of one or more configuration files, to the search service, a file system or a persistent storage the search service is using.

A headless content management system may be used to support a programming model for client applications, herein referred to as search-based applications or search-based application programs. Search-based applications rely on a search service to identify and retrieve contents, navigation information, site structures and/or page structures, etc. that is required for the functionality of the respective application. For example, during runtime a client application may send a series of search queries to a search service and retrieve information required for rendering the current view of the application from the search query responses. In contrast to other programming models, the application may, e.g., not use databases, file systems or other persistency components for managing this information. In order to support the search-based application, the content management system may provide the search service for the search-based application.

Content authors may use the content management system to edit information that is relevant for the search-based applications, like site structures, page structures, navigation structures, and contents, as well as assets, like images, videos, etc. Using this information, content authors may further create new pages, author new content, define new content types and/or define new page types. A modified site may be reviewed, approved, and subsequently published using the content management system. A CMS publishing component used for publishing may index the data in a search service. Therefore, when the publishing is completed, the data may be available to search-based applications through interfaces of the search service.

A search-based application may rely on sending search queries to a search service to retrieve content and the navigation elements to be presented to a user. User interface components may be used for rendering information, like, e.g., page headers and page footers for rendering a page, site maps, trees, menus, or links for rendering the site structure or navigation structure, etc. This way, layout aspects may be separated from the content, site structure and navigation structure.

Embodiments may have the beneficial effect that search queries used by a search-based application are not hard-coded in the application code as defined by an application developer during development of the respective search-based application or provided in a properties file which is part of the respective application. Instead the search queries to retrieve data used by the search-based application, such as content items, are managed in the content management system. For this purpose, a second search query may be represented as a content item or a set of content items of a specific content type, i.e., the search query type. This allows a content author to use the normal authoring functionality to create and edit second search queries, which are handled like content items by the content management system.

The search queries of the search-based application are changeable without modifying the application. In order to be able to use modified search queries a user is not required to update or redeploy a modified version of the application comprising the modified search queries on a client device.

Embodiments may have the beneficial effect that by modifying the second search queries, i.e., the search results of the first search queries, the functionality of the search-based application may be influenced without requiring a code change in the search-based application.

According to embodiments, the search service and the analysis component are provided by a content management system. The content management system further provides an authoring service which enables creating and editing content items managed by the content management system. The authoring service is used for the modifying of the determined second search query. Embodiments may have the beneficial effect that the second search queries may be managed by the content management system as content items of a specific type enabling a personalization of searches using personalized versions of second search queries independent of the first search queries issued by the client application.

According to embodiments, the imported external content items are added as content items to be managed the content management system. Embodiments may have the beneficial effect of extending the data content managed by the content management system to cover external content items from sources of external content items according to user individual preferences.

According to embodiments, the importing of the external sample content items is triggered by means of the authoring service. Embodiments may have the beneficial effect that an import of external content items not necessarily has to be triggered by the user directly. The external content items imported may, e.g., be additional external content items determined using an external content item imported before, relevance metrics indicate a relevance of the additional external content items for the user and/or a clustering of users and associations of each of the users to the additional external content items.

The user may add the external content items to the current state, i.e., page or application view, of the application as they are. This user interaction may be implemented in form of a copy-paste-operation, e.g., in form of a drag and drop operation. According to further embodiments, the user may use the external content items as a representation or a sample of relevant content to be added to the client application. In this case, the external content items selected and provided by the user interaction and/or its metadata may be used by the client application, e.g., the personalization component, or by the content management system, e.g., the analysis component, as a starting point for inferring semantics of the external content items imported. Furthermore, it may be crawled for similar content items in one or more sources of external content. A selection of the similar content found may be added to the client application. According to embodiments, the analysis component may be configured to automatically determine a further set of similar external content items, e.g., by starting a web crawler, analyzing received external content items, and filtering for external content items being similar to the external content items passed by the personalization component. This further external content items may be analyzed and stored in the content management system as additional external content items in addition to the external content selected by the user explicitly.

According to embodiments, the importing is triggered by means of a user interaction. According to embodiments, the user interaction comprises a track and drop operation. Embodiments may have the beneficial effect of enabling the user to adapt the client application according to user individual preferences and taking the respective adaption into account for future searches.

According to embodiments, the determining of the second search query comprises executing by the search service a first search query comprising an identifier of the set of content items being amended with the imported external content items. The identifier may, e.g., be provided in form of an application view identifier identifying an application view comprising the respective set of content items. According to embodiments, the second search query may further comprise an identifier of the client application used for the determining. Embodiments may have the beneficial effect of providing an efficient and effect way of determining second search queries to be personalized.

According to embodiments, the executing of the first search query retrieves a set of one or more ranked content items of the search query type. The determining of the second search query comprises selecting a top ranked content item of the search query type from the set of ranked content item of the search query type as the determined second search query. Embodiments may have the beneficial effect of modifying the most relevant second search query.

According to embodiments, the modifying of the determined second search query further comprises depending on a scope defined for the modification adding a user identifier identifying the user of the client application or a user group identifier identifying a user group comprising the user of the client application. Embodiments may have the beneficial effect that a scope of a modification may, e.g., by the user, be restricted to a single user or be valid for an entire user group comprising the respective user.

According to embodiments, the first search query may comprise a user identifier of a user or a user group identifier of a user group as a keyword for identifying the personalized version of a second search query comprising the user identifier or user group identifier. The user identifier or user group identifier may be comprised by a boost sub-query as a boosting factor. Embodiments may have the beneficial effect of ensuring that a potential personalized version of the second search query is ranked higher than a non-personalized version, i.e., that a modified version taking into account the imported external content items may be used rather than a non-modified version.

According to embodiments, the extracted keywords are added to the determined second search query in form of one or more sub-queries comprising the additional search parameters. Embodiments may have the beneficial effect that the more extracted keywords, i.e., keywords relevant for the user, a second search result comprises the higher it may be ranked. According to embodiments, the extracted keywords are comprised by one or more disjunctively connected sub-queries. Embodiments may have the beneficial effect that the respective disjunctively connected sub-queries may be used as a boost factor to ensure that second search results comprising more extracted keywords are ranked higher than second search results comprising fewer extracted keywords. A disjunctive connection implements a logical "or" as a truth-functional operator of a set of operands which is true if and only if one or more of its operands are true. For example, the extracted keywords are added using the following sub-query structure: "OR <keyword_field>:keyword1 OR <keyword_field>:keyword2 OR <keyword_field>:keyword3 . . . ".

According to embodiments, the received information comprises the imported external content items. Embodiments may have the beneficial effect of enabling the analysis component to extract the keywords and/or receiving the imported external content items directly from the received information.

According to embodiments, the received information comprises one or more links to one or more sources of external content. The extracting of the keywords comprises a downloading of external content items provided by the source under the link for analysis by the analysis component. Embodiments may have the beneficial effect that the analysis component extracts the keywords and/or receives the imported external content items from the original source of the respective external content items. Thus, for the analysis more than just the imported external content items may be taken into account.

According to embodiments, the imported external content items are used as sample items for determining additional external content items to be imported from additional sources of external content. Embodiments may have the beneficial effect of taking into account more than just the external content items imported. For example, the additional external content items may suite the user individual preferences as good as the external content items imported or even better. In order to take these additional external content items into account, the content management system is not required to wait for the user to find the respective additional external content items first and add them, e.g., using a drag and drop operation, to an application view. The content management system may rather determine them on its own and provide them automatically to the user.

According to embodiments, the determining of the additional external content items comprises crawling additional sources of external content, analyzing external content items provided by the crawling and filtering for additional external content items similar to the imported external content items. Embodiments may have the beneficial effect of providing an effective and efficient way to discover and take into account additional external content items potentially satisfying user individual preferences for a personalization of searches of the search service. A crawler used for the crawling may be configured for traversing websites to retrieve their content, e.g., documents, images, or videos, to store them as content items. The respective content items may be stored in the search index in order to be searchable by the search service. The crawler may deconstruct datasets provided by the websites and/or assigning surrogates for storage in a search index. An indexer may be used by the search service for generating and amending search indexes. The search index may be stored in a database assigned to the search engine.

According to embodiments, additional external content items to be imported are determined using one or more relevance metrics for determining additional external content items to be imported. The relevance metrics indicate a relevance of the additional external content items for the user and are calculated using an analysis of a log of search queries and content items the user interacts with. The respective log may be a log comprised by the content management system, e.g., the analysis component, or by the client application, e.g., the personalization component. Embodiments may have the beneficial effect of providing a method for assessing the relevance of additional external content and restrict the import of additional external content to additional external content items that are actually relevant to the user. For example, relevance metrics may be determined for content items and/or search queries comprised by the log. The relevance metrics may, e.g., take into account how often the user interacted with the respective content items and/or search queries within a given timeframe, i.e., number of interactions divided by time. The determined relevance metrics may be transferred to the additional external content items based on similarity.

According to embodiments, additional external content items to be imported are determined using a clustering of users and associations of each of the users to a set of external content items for selecting the additional external content items to be imported. Embodiments may have the beneficial effect of taking into account multiple users. Users of the same cluster may be assumed to have similar preferences. For example, the more users of a cluster being associated with a given external content item, the higher the relevance of the respective external content item for other users of the same cluster not yet associated with the external content item may be.

A clustering refers to the task of grouping a set of data objects, e.g., users and/or associations of each of the users to a set of external content items, in such a way that data objects in the same group, i.e., in the same cluster, are more similar according to one or more criteria to each other than to those data objects in clusters. A clustering may be implemented using various algorithms. The clustering may, e.g., be a connectivity-based clustering, also known as hierarchical clustering, a centroid-based clustering, like, e.g., k-means clustering, a distribution-based clustering, like Gaussian mixture model clustering, or a density-based clustering. Thus, the clustering may, e.g., be based on distances between the data objects in a specific representation of the respective data objects, dense areas of the data space, intervals or particular statistical distributions. The clustering may be referred to as a type of unsupervised learning. Unsupervised learning refers to a branch of machine learning that learns from test data that has not been labeled, clustered or classified. Rather than responding to feedback, unsupervised learning identifies commonalities in data provided and reacts based on a detected presence or absence of the respective commonalities in each new dataset.

According to embodiments, for the clustering a distance measure over one or more of the following characteristics is used: organizational information about the users, analysis of one or more social graphs comprising the users, and data representing a past usage pattern of the users. Embodiments may have the beneficial effect of using organizational information about the users in order to define which users are organizational, e.g., in view of organizations they are a part of, working for or got involved with, related to each other. User may, e.g., be part of the same organization or may be part of different organization linked with each other. Embodiments may have the beneficial effect of using social graphs to identify relations between users. A social graph depicts personal relations of users interacting with each other over the Internet, in particular using social media services. A social graph is a model or representation of a social network, mapping relation between the members of the respective social network.

According to embodiments, for each cluster of users resulting from the clustering a set of ranked external content items is determined. External content items of the set of ranked external content items with a ranking exceeding a predefined threshold are selected as the additional external content items to be imported. Embodiments may have the beneficial effect of only external content items exceeding the predefined threshold, e.g., the top ranked external content item or a set of top ranked external content items, are selected to be imported.

The ranking may be based on the clustering, e.g., the ranking may depend on the level of relevance of the external content items for the users of the respective cluster and/or the number of users of the respective cluster for which the external content item is relevant and/or has a specific level of relevance.

According to embodiments, the method further comprises receiving by the search service a first search query issued by the query client application searching for the set of content items being amended with the imported external content items. The received first search query is executed by the search service. The stored content item of the search query type providing the modified second search query is retrieved as a first search result for the received first search query. The modified second search query is executed by the search service. The set of content items including the imported external content items is retrieved as a second search result for the modified second search query. The second search result is sent to the client application as a result of the received first search query. Embodiments may have the beneficial effect of using the modified, i.e., personalized second search query, to implement a personalized search of the search service taking into account user individual preferences of the user.

According to embodiments, the computer program product further comprises computer-readable program code configured to implement any of the embodiments of the method for implementing a personalizing of a search of a search service described herein.

According to embodiments, the computer system further is configured to execute any of the embodiments of the method for implementing personalizing of a search of a search service described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
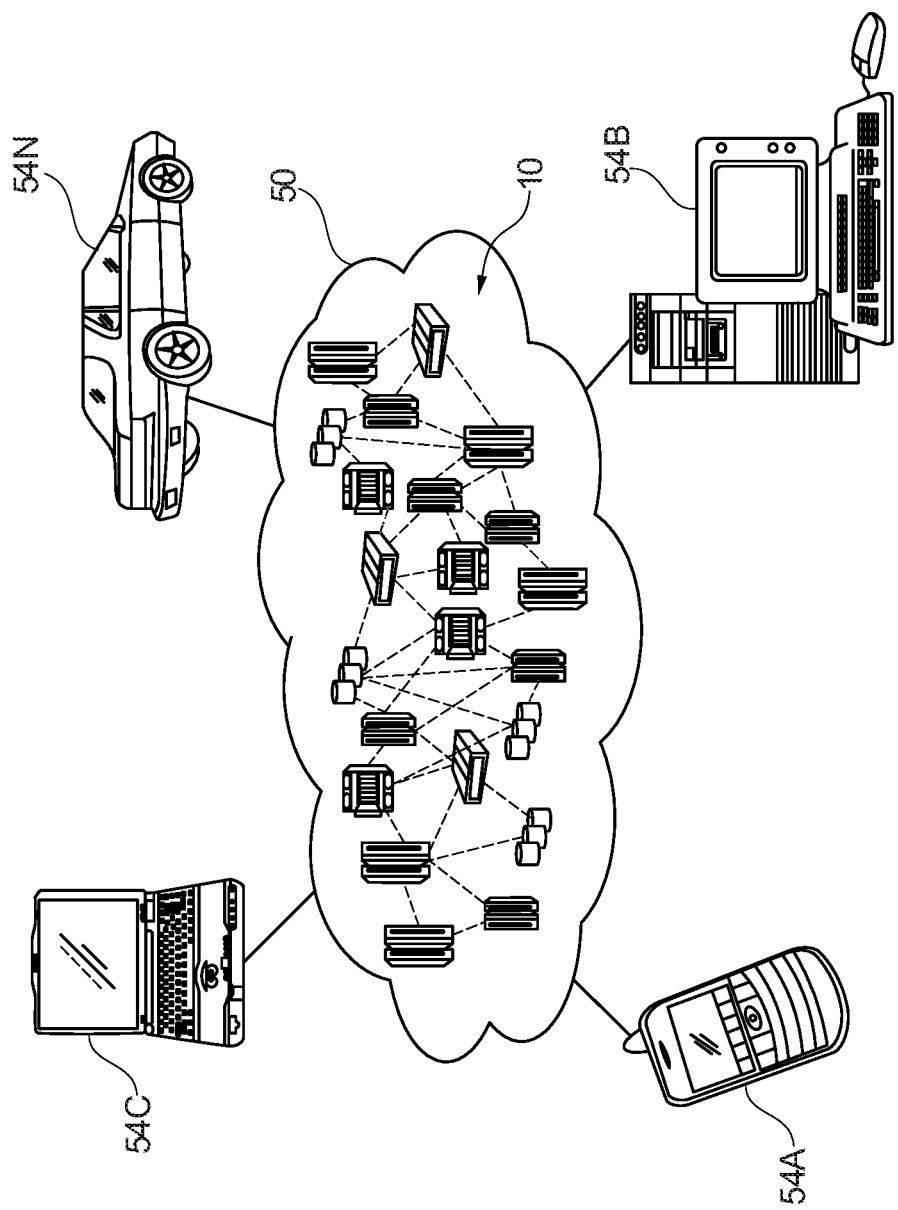
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
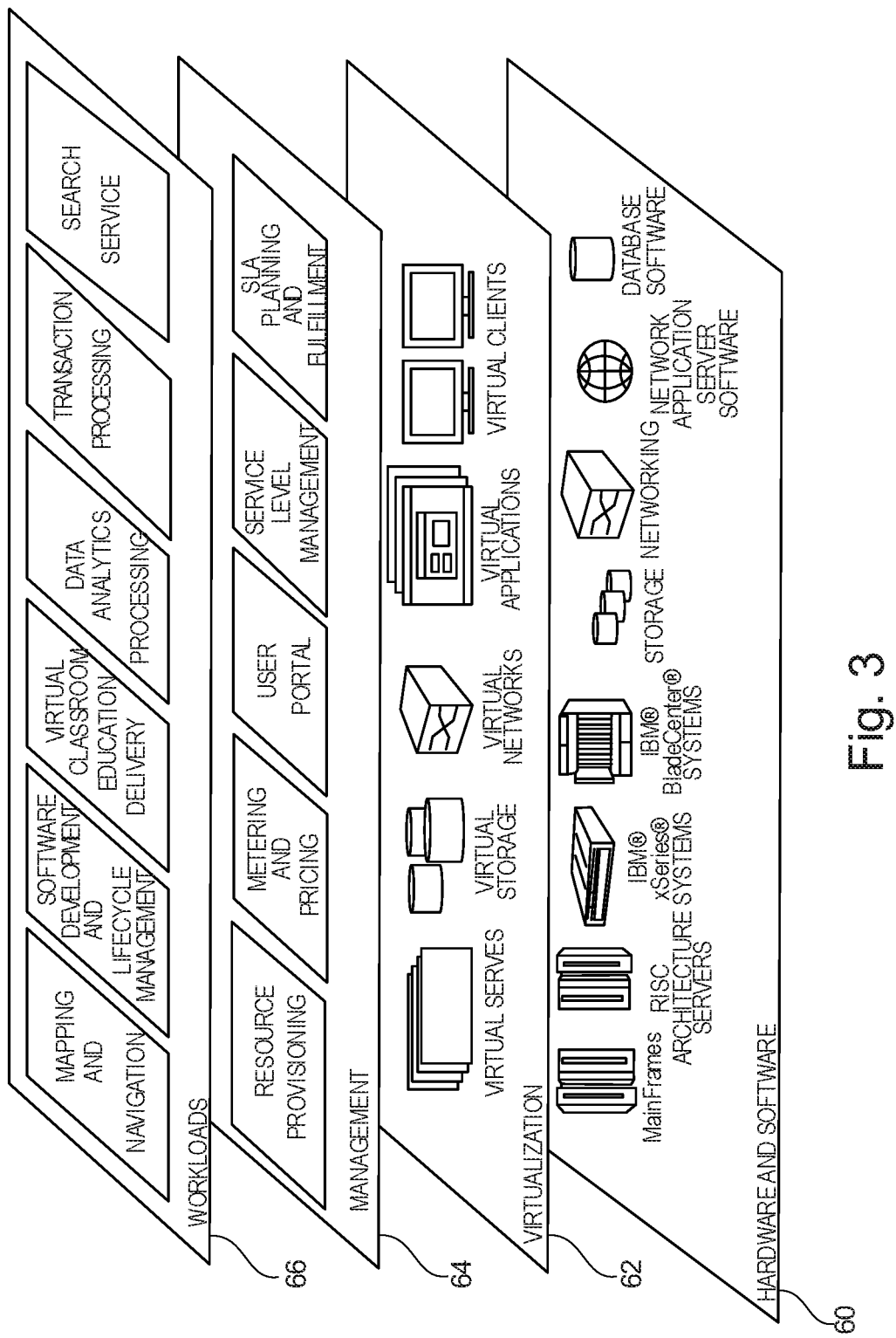
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g., a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g., access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; a search service, wherein means are provided for personalizing searches executed by the search service. The search service is, e.g., provided by a content management system configured for personalizing searches executed by the search service.

Figure 4:
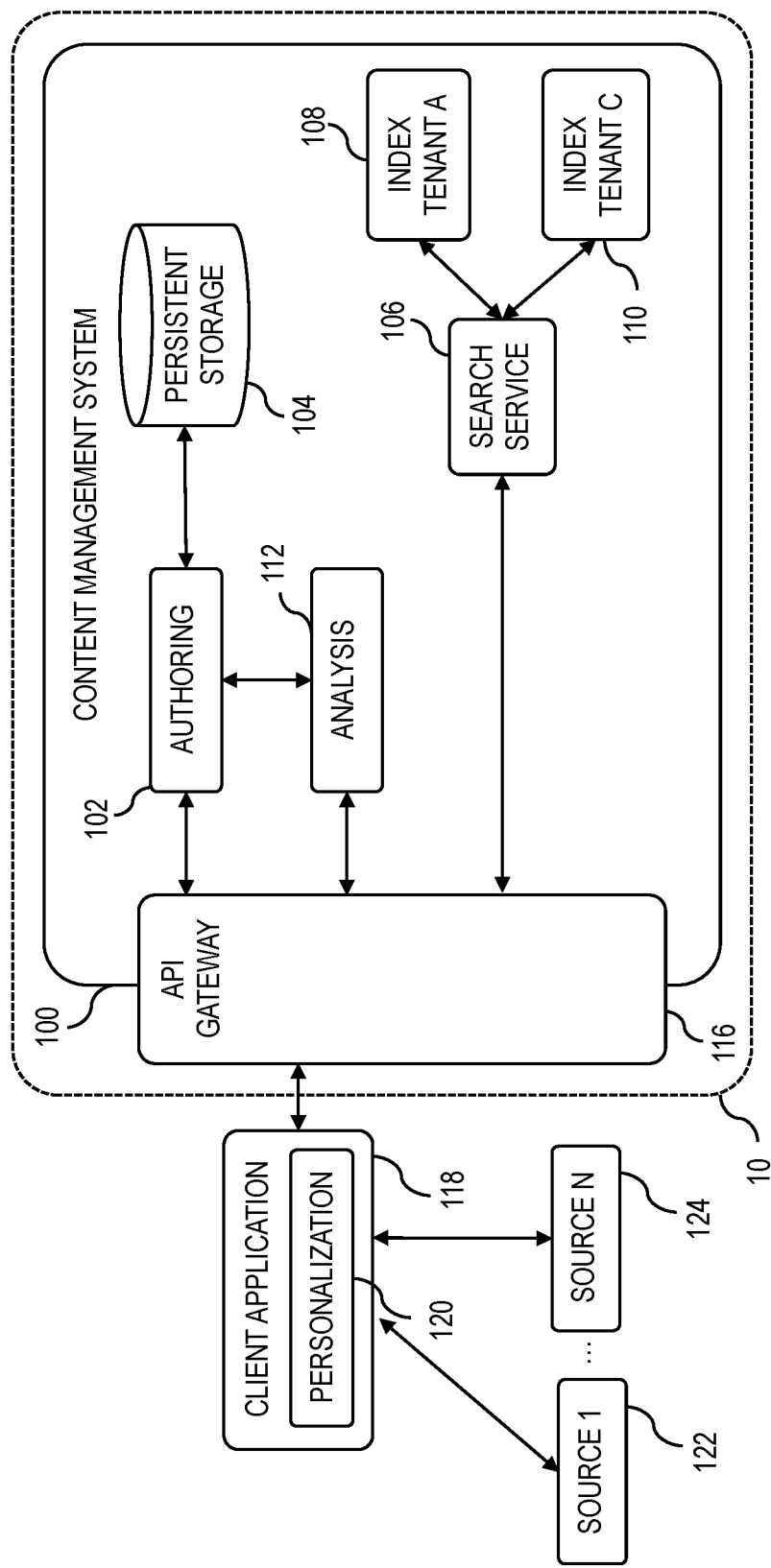
FIG. 4 depicts a schematic diagram illustrating an exemplary system for personalizing a search of a search service using sources of external content.

FIG. 4 depicts a schematic diagram illustrating an exemplary system for personalizing a search of a search service 106. The system may comprise a computer system, e.g., a cloud computing node 10, which provides a content management system 100. The content management system 100 manages digital content items, in particular a creation and modification of digital content items. Digital content items may, e.g., comprise text documents, webpages, images, videos, code scripts, etc. The content management system 100 comprises an authoring component 102 providing an authoring service for creating, modifying and editing content items managed by the content management system 100 as well as a persistent storage 104 for storing the content items created, modified and/or edited by the authoring component 102.

The content management system 100 further comprises a search service 106. The search service 106 may provide a search engine, i.e., an information retrieval software program configured for information retrieval and presentation in response to search queries. The search engine is configured for searching one or more search indexes 108, 110 with content items managed by the content management system 100. The search indexes 108, 110 contain representations of data content to be searched. The representation may be configuring to improve processing of search queries. The content items comprised by the search indexes 108, 110 may, e.g., content items of the search type providing second search queries. The search indexes 108, 110 may be tenant specific search indexes 108, 110, i.e., assigned to specific tenants. Depending on which tenant requests a search, the search service 106 may select one of the search indexes 108, 110 assigned to the requesting tenant. The search is then executed by the search engine according to the request using the selected search index 108, 110.

The search service 106 further comprises an analysis component 112 configured for extracting keywords comprised by the imported external content items. The analysis component 112 may comprise a text analysis sub-component, e.g., configured for information retrieval, lexical analysis to study word frequency distributions, pattern recognition, tagging/annotation, information extraction, data mining techniques including link and association analysis, visualization, and/or predictive analytics. The analysis component 112 may comprise an image recognition and/or analysis sub-component and/or a natural language processing sub-component, e.g., an entity extractor, parts of speech analyzer or tone analyzer. A tone analyzer, e.g., using IBM Watson® Tone Analyzer, may use linguistic analysis to detect emotional and language tones in written text. A tone analyzer may analyze a tone at document as well as sentence level. A tone analyzer may be used to identify emotions, e.g., anger, disgust, fear, joy and/or sadness, as well as social propensities of postings and/or tweets, e.g., openness, conscientiousness, extroversion, agreeableness, and/or emotional range. Thus, a set of keywords may be gained which express interests, emotions and characteristics related to an external content item and/or its author.

The external content items analyzed by the analysis component 112 may either be received from the client application 118, e.g., personalization component 120, or from sources of external content 122, 124 accessed by the analysis component 112 using links provided by the personalization component 120. The analysis component 112 may further be configured for creating additional content items, e.g., to integrate the external content items analyzed into the content management system 100 using the authoring component 102. The analysis component 112 may further be configured for modifying second search queries provided in form of search query tape content items.

The content management system 100 and more precisely the search service 106 may receive search queries, i.e., first search queries from the client application 118 via an API gateway 116. A client application 118 in form of a search-based application may rely on the search service 106 of the content management service 100 to identify and retrieve content items, e.g., comprising content data, navigation information, site structures and/or page structures, etc. that is required for the functionality of the respective client application 118. For example, the client application 118 may send during runtime a series of search queries via the API gateway 116 to the search service 106. The search service 106 executes the search queries using one of the search indexes 108, 110 assigned to the user of the client application 118. Thus, the client application 118 is enabled to retrieve information required for rendering an application views from the search results received. Thus, the client application 118 may not require a database, file system or other persistency component for managing on its own.

The client application 118 comprises a personalization component 120. The personalization component 120 comprises an interface to one or more sources of external content 122, 124, like, e.g., websites. External content items may refer to content items not comprised by the content management system 100, but which may be imported from external sources 122, 124. The personalization component 120 may be configured for importing external content from the sources 122, 124 of the external content to the client application 120, e.g., by a user interaction with the client application 118, like a drag and drop operation. Furthermore, the personalization component 120 may information specifying the imported external content items to the content management system 100, e.g., the analysis component 112 via the API gateway 116.

Figure 5:
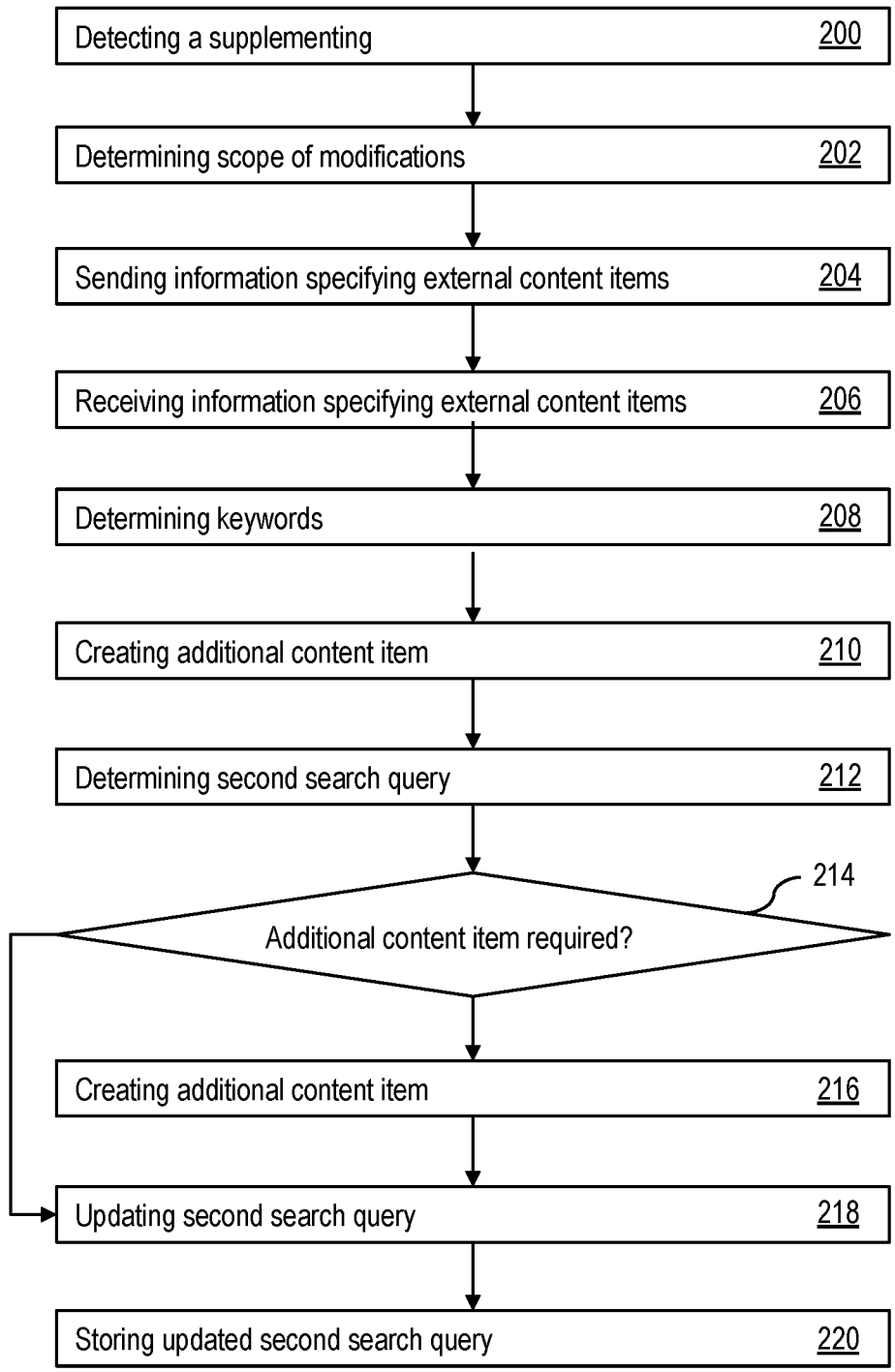
FIG. 5 depicts a schematic flow diagram of an exemplary method for personalizing a search of a search service using sources of external content.

FIG. 5 depicts a schematic flow diagram of an exemplary method for personalizing a search of a search service. In block 200, the personalization component detects a user interaction resulting in a user-driven supplementing of a set of data retrieved by the client application from a search service using a first search query. The search service may be provided by a content management system. The retrieved set of data may be provided in form of an application view displayed by the client application on a user interface. The detecting of a user interaction may, e.g., comprise a recognition of a drag and drop operation. The respective set of data is supplemented by one or more external content items imported from sources of external content. For example, an external content item like a text, an image, or a link may be imported from a web browser window displaying a source of external content in form of a webpage into the client application. In block 202, the personalization component determines a scope of the user selected modifications in form of the imported external content items. The scope of the modifications may either comprise the respective user only, i.e., result in a personalization for the user only, or comprise a group of users including the respective user, i.e., result in a personalization for the full group of users rather than only the respective user. In block 204, the personalization component invokes an analysis component and sends information specifying the imported external content items used for supplementing the data set displayed by the client application. The external content items, e.g., data content received from a drag and drop operation, may comprise a text, an image or a link. The analysis component may be provided by the content management system.

In block 206, the analysis component receives the information specifying the imported external content items. In block 208, the analysis component analyzes the received information and determines a set of keywords characterizing the imported external content items. The keyword may provide metadata of the imported external content items. The received information may comprise the imported external content items. If the additional data content comprises a link to a source of external data content, e.g., to a remote webpage, the analysis component may download the external content provided by the respective source under the link, comprising the imported external content items, and analyze the downloaded data content. If the external content comprises an image, the analysis component may use an image recognition and/or analysis routine for extracting a set of one or more keywords from or for the respective image. If the external content comprises text, the analysis component may use a natural language processing routine, e.g., an entity extractor, parts of speech analyzer or tone analyzer, for extracting a set of one or more keywords from the respective text. A tone analyzer, e.g., Watson® tone analyzer, is configured to identify emotions expressed in the analyzed external content items and extract keywords related to the emotions expressed. In block 210, the analysis component creates one or more additional content items for supplementing the content management system in order to integrated also the imported external content items of the user-driven supplementation of the data set provided by the client application. For example, the analysis component invokes an authoring service provided by the content management system for this purpose. The additional content items may comprise the imported external content items, unique content item identifiers and/or the determined set of keywords. The information regarding the imported external content items acquired by the analysis component may be send to the personalization component.

In block 212, the personalization component determines the actual second search query to be extended, i.e., the search query which retrieves the information for the supplemented set of data of the client application, i.e., the respective application view. For this purpose, the client application may determine an application view identifier of the supplemented view and then issues a search query searching for content items of the type "search query", i.e., second search queries, provided by the content management system comprising the respective application view identifier and the application identifier of the respective client application. The query issued by the client application is received and processed by the search service. As a search result of the respective search query, the search service may return the one or more content items of search query type comprising a query specification, e.g., in Solr syntax, of the respective second search query, a search query identifier identifying the respective second search query as well as keywords assigned to the respective second search query. For example, a top ranked content item of the search query type may be returned. In block 214, the personalization component determines if it is necessary to create an additional content item of the search query type. An additional content item of the search query type may, e.g., be required, if there is no content item returned or the content item is a content item personalized for another user or for a group of users, while the scope of the present modification is restricted to a single user. If an additional content item is required, the additional content item is created in block 216. In block 218, the personalization component or alternatively the analysis component updates the content item of search query type by adding the determined keywords extracted from the imported external content items. The determined keywords may be added in form of a sub-query comprising the determined keywords. The updating may further comprise adding a keyword to the content item depending on the scope determined for the user-driven modifications. The respective keyword depending on the scope may either be a user identifier identifying an individual user, if the scope only comprises the respective user, or a user group identifier identifying a user group to which the respective user belongs, if the scope comprises the respective user group. For example, the user identifier may be added in form of the following Solr boost query for the user identifier: "bq=<keyword_field>:<userid>^10.0"; and the user group identifier in form of the following boost query: "bq=<keyword_field>:<groupid>^10.0". Furthermore, the determined keywords may be added. The determined keywords may be added in for of a set of one or more sub-queries supplementing the query specification that is comprised in the respective content item. The sub-queries may, e.g., be disjunctively linked to the existing query specification and contain the set of or a subset of the keywords determined by the analysis component. Alternatively, in case of an additional content items comprising the imported external content items, the respective sub-queries may comprise content item identifiers of the respective additional content items. The sub-queries extend the original query to also take in to account the external content items that has additionally been stored in the content management system and that is described by the determined keywords, i.e., that is similar to the user-driven supplement of data content, e.g., dragged and dropped by the user. For example, the determined keywords are added using the following sub-query structure: "OR <keyword_field>:keyword1 OR <keyword_field>:keyword2 OR <keyword_field>:keyword3 . . . ".

In block 220, the updated second search query is stored. The storing may be executed in response to a user instruction, e.g., a store instruction, or automatically. When the user chooses to store the updated search query, the personalization component may send the updated content item of search query type to the authoring service of the content management system which implements the update by updating the version of the respective content item stored in the content management system, i.e., updating the respective second search query. After completing these steps, the client application is enabled to automatically use the updated second search query taking into account the user individual preferences as indicated by the user-driven supplements of former search results. The updated second search query may retrieve the imported external data content that is thus made available to the search service and/or the content managements system.

It is understood that one or more of the aforementioned embodiments of the invention may be combined as long as the combined embodiments are not mutually exclusive.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for personalizing a search of a search service, the method comprising the steps of:
   receiving, by one or more computer processors, one or more external content items;
   extracting, by one or more computer processors, one or more keywords from the external content items;
   determining, by one or more computer processors, a search index, wherein the search index comprises content items of a search query type for use as first search results for a first search query;
   determining, by one or more computer processors, a second search query suitable for retrieving the one or more external content items using the one or more keywords;
   modifying, by one or more computer processors, the first search query by adding the one or more keywords as additional search parameters of the first search query; and
   storing, by one or more computer processors, the modified first search query in the search index as the first search query.

2. The computer-implemented method of claim 1, wherein the receiving of the one or more external content items is triggered by user interaction.

3. The computer-implemented method of claim 1, wherein the one or more keywords are added to the determined second search query in form of one or more sub-queries comprising the additional search parameters.

4. The computer-implemented method of claim 1, wherein the received one or more content items comprises one or more links to the one or more external content items, wherein the extracting of the one or more keywords comprises downloading of external content items.

5. The computer-implemented method of claim 1, wherein the one or more external content items are determined using a clustering of users and associations of each of the users to a set of external content items.

6. The computer-implemented method of claim 5, wherein the clustering of users is selected from the group consisting of organizational information about the users, analysis of one or more social graphs comprising the users, and data representing a past usage pattern of the users.

7. The computer-implemented method of claim 6, wherein for each cluster of users resulting from the clustering, a set of ranked one or more external content items is determined, wherein external content items of the set of ranked external content items with a ranking exceeding a predefined threshold are selected as the received additional one or more external content items.

8. A computer program product for personalizing a search of a search service, the computer program product comprising:
   one or more computer readable storage media; and
   program instructions stored on the one or more computer readable storage media, the program instructions comprising:
      program instructions to receive one or more external content items;
      program instructions to extract one or more keywords from the external content items;
      program instructions to determine a search index, wherein the search index comprises content items of a search query type for use as first search results for a first search query;
      program instructions to determine a second search query suitable for retrieving the one or more external content items using the one or more keywords;
      program instructions to modify the first search query by adding the one or more keywords as additional search parameters of the first search query; and
      program instructions to store the modified first search query in the search index as the first search query.

9. The computer program product of claim 8, wherein the receiving of the one or more external content items is triggered by user interaction.

10. The computer program product of claim 8, wherein the one or more keywords are added to the determined second search query in form of one or more sub-queries comprising the additional search parameters.

11. The computer program product of claim 8, wherein the received one or more content items comprises one or more links to the one or more external content items, wherein the extracting of the one or more keywords comprises downloading of external content items.

12. The computer program product of claim 8, wherein the one or more external content items are determined using a clustering of users and associations of each of the users to a set of external content items.

13. The computer program product of claim 12, wherein the clustering of users is selected from the group consisting of organizational information about the users, analysis of one or more social graphs comprising the users, and data representing a past usage pattern of the users.

14. The computer program product of claim 13, wherein for each cluster of users resulting from the clustering, a set of ranked one or more external content items is determined, wherein external content items of the set of ranked external content items with a ranking exceeding a predefined threshold are selected as the received additional one or more external content items.

15. A computer system for personalizing a search of a search service, the computer system comprising:
   one or more computer processors;
   one or more computer readable storage media; and
   program instructions, stored on the one or more computer readable storage media for execution by at least one of the one or more computer processors, the program instructions comprising:
      program instructions to receive one or more external content items;
      program instructions to extract one or more keywords from the external content items;
      program instructions to determine a search index, wherein the search index comprises content items of a search query type for use as first search results for a first search query;
      program instructions to determine a second search query suitable for retrieving the one or more external content items using the one or more keywords;
      program instructions to modify the first search query by adding the one or more keywords as additional search parameters of the first search query; and
      program instructions to store the modified first search query in the search index as the first search query.

16. The computer system of claim 15, wherein the receiving of the one or more external content items is triggered by user interaction.

17. The computer system of claim 15, wherein the one or more keywords are added to the determined second search query in form of one or more sub-queries comprising the additional search parameters.

18. The computer system of claim 15, wherein the received one or more content items comprises one or more links to the one or more external content items, wherein the extracting of the one or more keywords comprises downloading of external content items.

19. The computer system of claim 15, wherein the one or more external content items are determined using a clustering of users and associations of each of the users to a set of external content items.

20. The computer system of claim 19, wherein the clustering of users is selected from the group consisting of organizational information about the users, analysis of one or more social graphs comprising the users, and data representing a past usage pattern of the users.

* * * * *